United States Patent [19]

Foltz

[11] Patent Number: 5,402,465
[45] Date of Patent: Mar. 28, 1995

[54] TELEPHONE TROUBLE ISOLATOR

[76] Inventor: Jack D. Foltz, 901 R. Johnson Ave., Dennison, Ohio 44621

[21] Appl. No.: 160,266

[22] Filed: Dec. 2, 1993

[51] Int. Cl.$^6$ .............................................. H04M 1/24
[52] U.S. Cl. ........................................ 379/26; 379/27
[58] Field of Search ...................... 379/27, 29, 25, 26

[56] References Cited

U.S. PATENT DOCUMENTS

| | | | | |
|---|---|---|---|---|
| 4,388,501 | 6/1983 | Ahuja | | 379/27 |
| 4,415,778 | 11/1983 | Turner | | 379/27 |
| 4,991,196 | 2/1991 | Krebs | | 379/27 |

Primary Examiner—Stephen Chin
Assistant Examiner—Kevin Kim

[57] ABSTRACT

A telephone trouble isolator comprising a hollow container adapted to receive a plurality of external and internal telephone lines from a telephone branch exchange and internal telephone lines resident in a home or business; a trouble isolator circuit disposed within the hollow container, the isolator circuit including a plurality of telephone activation circuits connected in parallel, the activation circuits adapted to be connected in parallel with the external phone lines, each activation circuit having a switch connected in series with an internal telephone line terminal, whereby an internal telephone line connected to the internal telephone line terminal may be activated or deactivated with the switch, and a telephone test jack connected in parallel with the activation circuits and adapted to be connected in parallel with external phone lines, the test jack adapted to receive a test telephone such that a user may monitor dial tones on the lines, with the isolator circuit adapted to be energized by an external power source; and means for selecting an external telephone line from the plurality of external telephone lines available for testing.

2 Claims, 3 Drawing Sheets

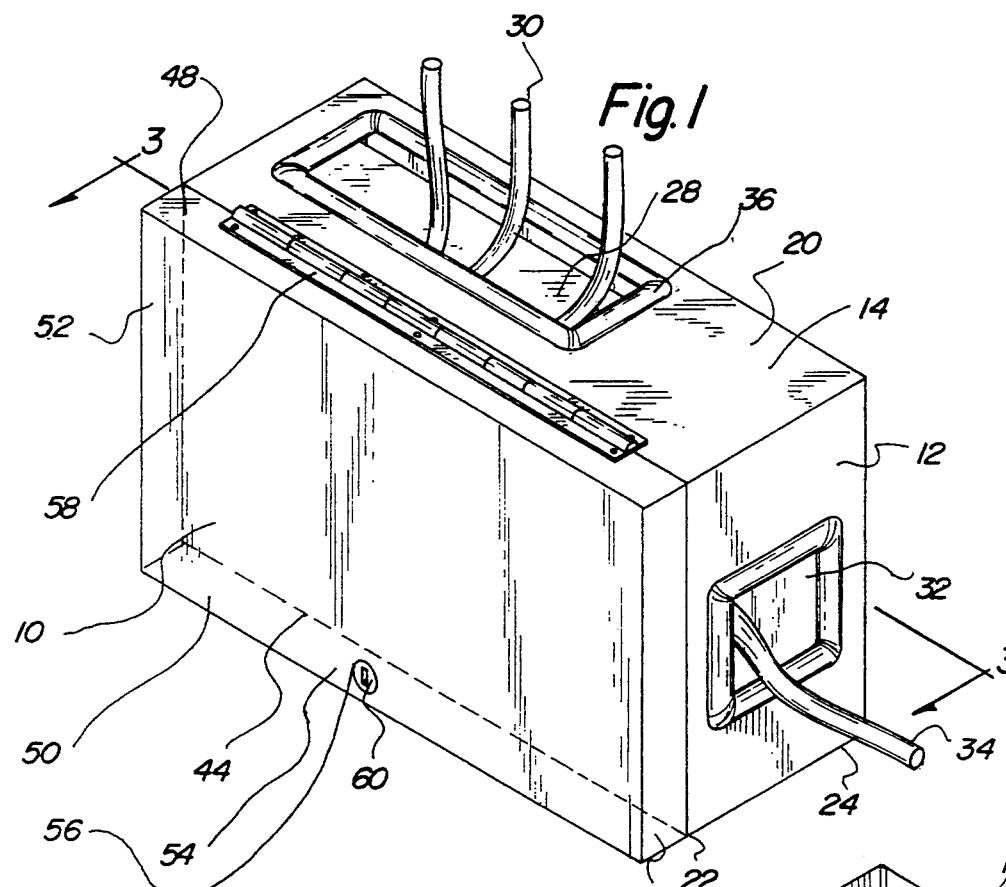
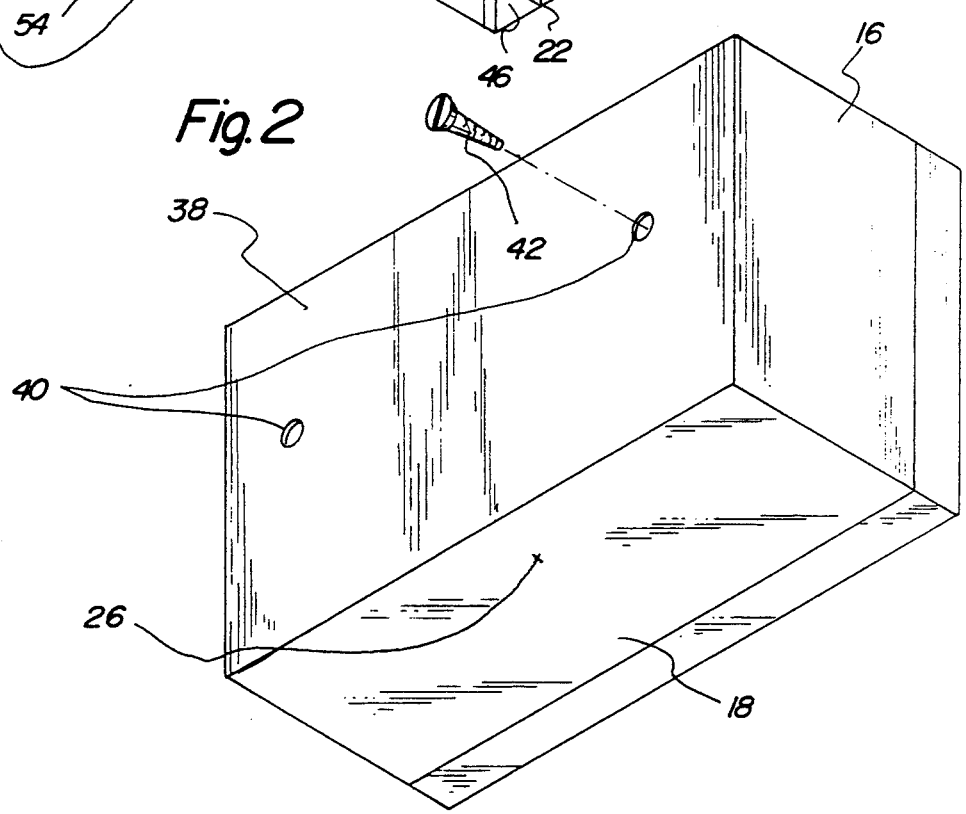

TELEPHONE TROUBLE ISOLATOR

BACKGROUND OF THE INVENTION

1. Field of the Invention

The present invention relates to telephone trouble isolator and more particularly pertains to a method and device which may be used to isolate problems on telephone lines.

2. Description of the Prior Art

The use of devices to isolate problems on telephone lines is known in the prior art. More specifically, devices heretofore devised and utilized for the purpose of isolating problems on telephone lines are known to consist basically of familiar, expected and obvious structural configurations, notwithstanding the myriad of designs encompassed by the crowded prior art which have been developed for the fulfillment of countless objectives and requirements.

For example, U.S. Pat. No. 3,816,674 to Andrews, Jr., et al., U.S. Pat. No. 4,438,299 to Tomin, U.S. Pat. No. 4,488,011 to Rogers, U.S. Pat. No. 5,092,785 to Chen, depict devices used to test telephone sets and lines.

Other patents that include components generally related to the present invention are U.S. Pat. No. 4,237,342 to Eller, et. al, and U.S. Pat. No. 4,647,725 to Dellinger, et. al.

While these devices fulfill their respective, particular objective and requirements, the aforementioned patents do not describe a telephone trouble isolator that may to isolate problems on a plurality of telephone lines and is operable by a novice user.

In this respect, the telephone trouble isolator according to the present invention substantially departs from the conventional concepts and designs of the prior art, and in so doing provides an apparatus primarily developed for the purpose of isolating problems on telephone lines.

Therefore, it can be appreciated that there exists a continuing need for new and improved telephone trouble isolator which can be used to isolate problems on telephone lines. In this regard, the present invention substantially fulfills this need.

SUMMARY OF THE INVENTION

In view of the foregoing disadvantages inherent in the known types of devices for isolating problems on telephone lines now present in the prior art, the present invention provides an improved device for isolating problems on telephone lines. As such, the general purpose of the present invention, which will be described subsequently in greater detail, is to provide a new and improved device for isolating problems on telephone lines which has all the advantages of the prior art and none of the disadvantages.

To attain this, the present invention essentially comprises four rigid and essentially rectangular side plates coupled together end to end in a rectangular configuration to define a container having four sides, a top edge, a bottom edge, and a space therebetween, with two adjacent sides each having a hole disposed thereon, one of the holes adapted for receipt of a plurality of internal telephone lines, internal telephone lines being lines connected to telephones in a home or business, the other hole adapted for receipt of an external telephone line, the external telephone line being a line connected to a telephone branch exchange, each hole further having an elastomeric grommet coupled thereon to protect the telephone lines disposed therethrough from being damaged, a rigid and essentially rectangular bottom plate coupled to the bottom edge of the container, the plate having two spaced and aligned holes disposed thereon, the holes adapted to receive screws in order to mount the container at a position to receive the internal and external telephone lines, a rigid and essentially rectangular top plate having four rigid and essentially rectangular side plates coupled together end to end in a rectangular configuration around the periphery of the top plate to define a lid, the lid adapted to fit over the top edge of the container, the lid having a hole disposed thereon adjacent to the periphery of the front face, with the hole adapted for receipt of a lock for securing the lid to the container, a hinge rotatably coupling the lid to the container, a lock disposed through the hole of the cover for locking the cover to the container, a trouble isolator circuit disposed within the space of the container, the isolator circuit including a plurality of telephone activation circuits connected in parallel, the activation circuits adapted to be connected in parallel with the external phone line, each activation circuit having a switch connected in series with an internal telephone line terminal, whereby an internal telephone line connected to the internal telephone line terminal may be activated and deactivated with the switch, and a telephone test jack connected in parallel with the activation circuits and adapted to be connected in parallel with an external phone line, the test jack adapted to receive a test telephone such that a user may monitor dial tones on the lines, with the isolator circuit adapted to be energized by an external power source, and a rigid and essentially rectangular front plate disposed over the trouble isolator circuit in the space, the plate having a plurality holes disposed thereon, the holes adapted to provide a user access to the telephone test jack, telephone line terminals, and switches of the isolator circuit while shielding the rest of the isolator circuit from user interaction and environmental elements such as dust.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved device for isolating problems on telephone lines which has all the advantages of the prior art and none of the disadvantages.

It is another object of the present invention to provide a new and improved device for isolating problems on telephone lines which may be easily and efficiently manufactured and marketed.

It is a further object of the present invention to provide a new and improved device for isolating problems on telephone lines which is of a durable and reliable construction.

An even further object of the present invention is to provide a new and improved device for isolating problems on telephone lines which is susceptible of a low cost of manufacture with regard to both materials and labor, and which accordingly is then susceptible of low prices of sale to the consuming public, thereby making such a device for isolating problems on telephone lines economically available to the buying public.

Still yet another object of the present invention is to provide a new and improved device for isolating problems on telephone lines which provides in the apparatuses and methods of the prior art some of the advantages thereof, while simultaneously overcoming some of the disadvantages normally associated therewith.

Still another object of the present invention is to provide a new and improved device for isolating problems on telephone lines that may be used to troubleshoot a plurality of phone lines resident in a home or business.

Yet another object of the present invention is to isolate problems on telephone lines by a method and apparatus that is simple to operate.

Yet another object of the present invention is to provide distinguish between telephone problems to an internal line resident in a home or business and problems to an external line from a telephone branch exchange.

Even still another object of the present invention is to provide a telephone trouble isolator comprising a hollow container adapted to receive a plurality of external and internal telephone lines, a trouble isolator circuit disposed within the hollow container, the isolator circuit including a plurality of telephone activation circuits connected in parallel, the activation circuits adapted to be connected in parallel, the activation circuits with the external phone lines, each activation circuit having a switch connected in series with an internal telephone line terminal, whereby an internal telephone line connected to the internal telephone line terminal may be activated or deactivated with the switch, and a telephone test jack connected in parallel with the activation circuits and adapted to be connected in parallel with external phone lines, the test jack adapted to receive a test telephone such that a user may monitor dial tones on the lines, with the isolator circuit adapted to be energized by an external power source, and means for selecting an external telephone line from the plurality of external telephone lines available for testing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the device for isolating problems on telephone lines constructed in accordance with the principles of the present invention.

FIG. 2 is a perspective view of the container and integral holes used to secure it to a location to receive telephone lines.

DESCRIPTION OF THE PREFERRED EMBODIMENT

Figure 3:
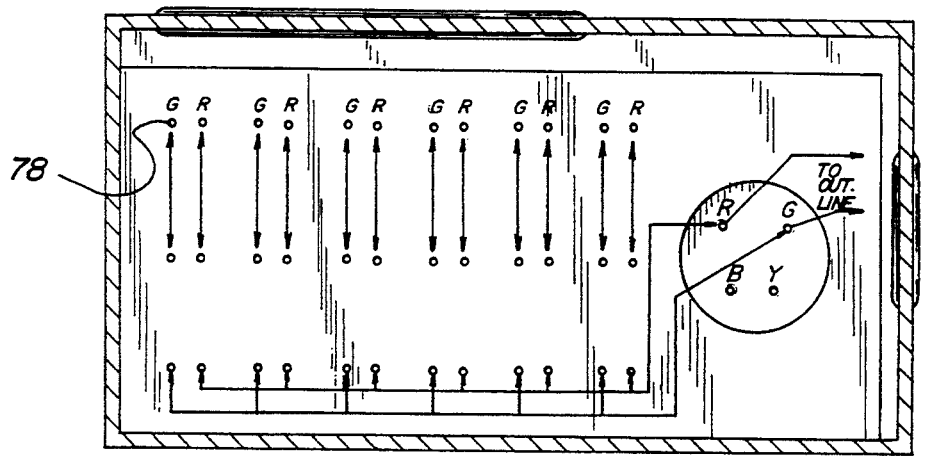
FIG. 3 is a view of rear portion of the telephone trouble isolator.
Figure 4:
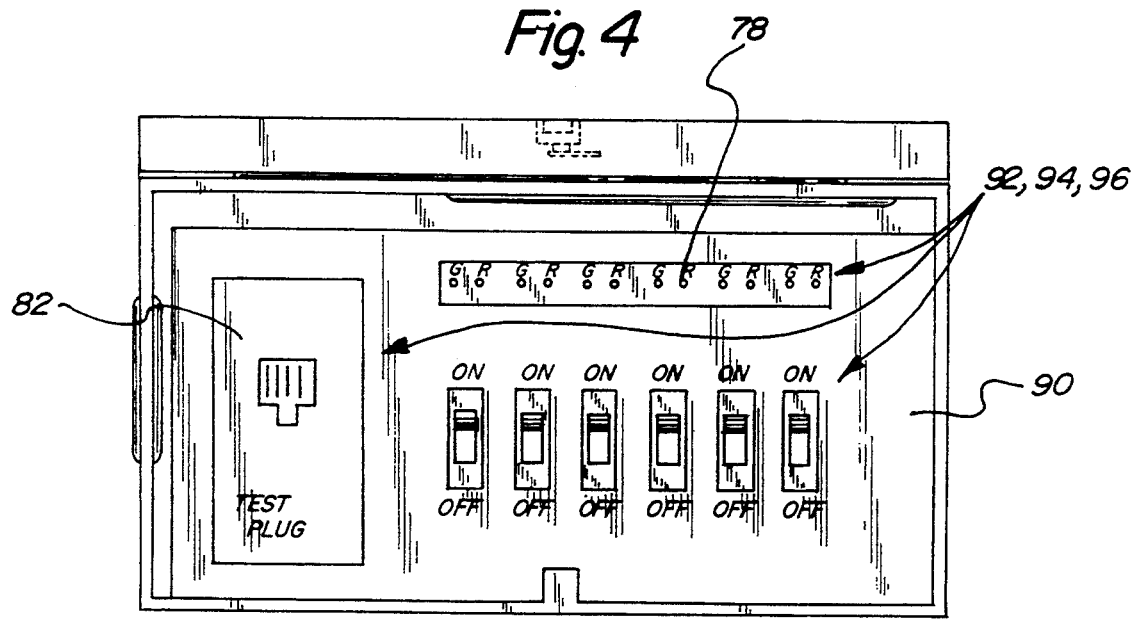
FIG. 4 is a view of the front portion of the telephone trouble isolator.
Figure 5:
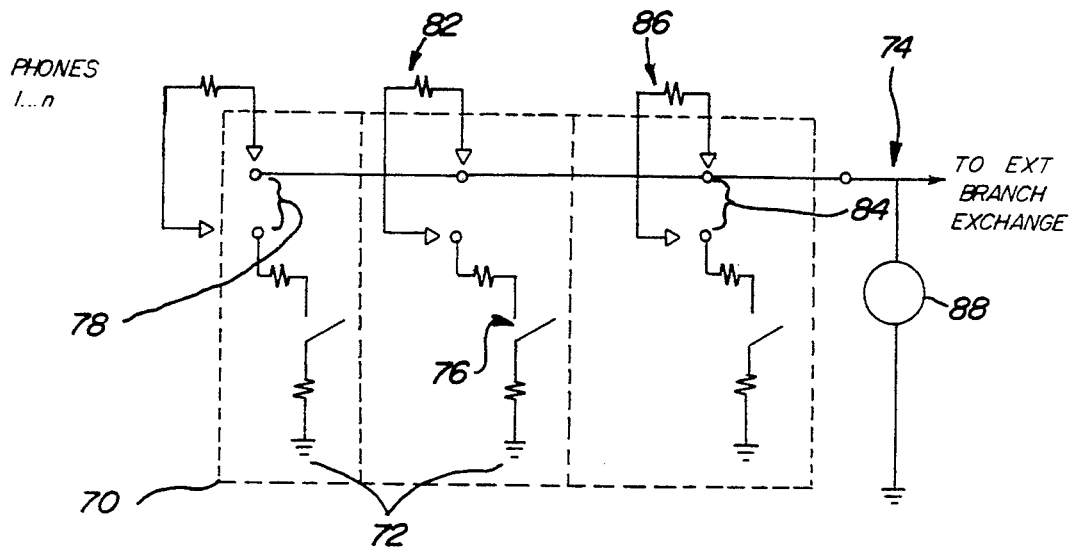
FIG. 5 is a schematic of the trouble isolator circuit resident in the telephone trouble isolator.
Figure 6:
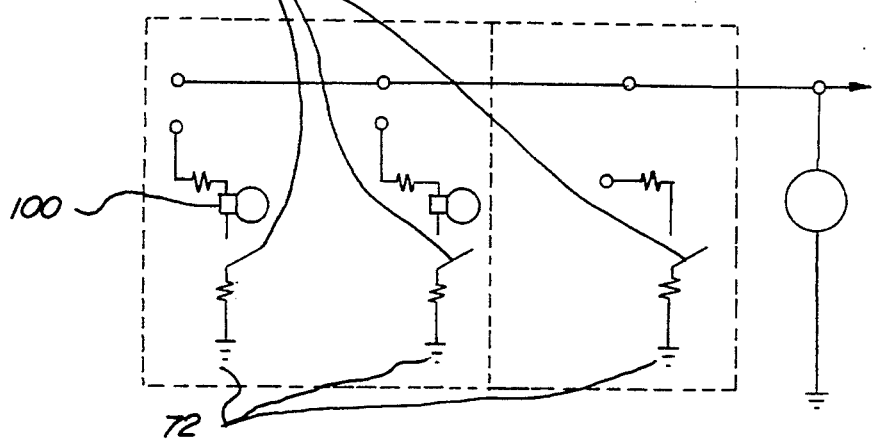
FIG. 6 is a schematic of an alternate circulator constructed in accordance with the principles of the present invention.
Figure 7:
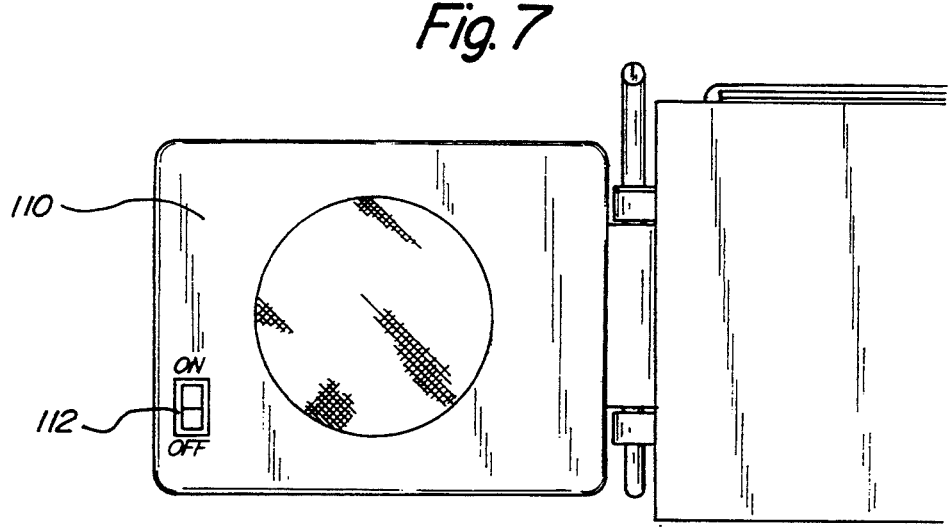
FIG. 7 is a side view of an alternate embodiment of the invention constructed in accordance with the principles of the present invention.

With reference now to the drawings, and in particular to FIG. 1 thereof, a new and improved telephone trouble isolator embodying the principles and concepts of the present invention and generally designated by the reference numeral 10 will be described.

The telephone trouble isolator 10 comprises rigid and essentially rectangular side plates 12, 14, 16, and 18 coupled together end to end in a rectangular configuration to define a container 20 having a top edge 22, a bottom edge 24, and a space 26 therebetween. Two adjacent sides of the container each have a hole disposed thereon. One hole 28 is adapted for receipt of a plurality of internal telephone lines 30, the internal telephone lines being lines connected to telephones in a home or business. The other hole 32 is adapted for receipt of an external telephone line 34, the external telephone line being a line connected to a telephone branch exchange. Each hole has a rubber grommet 36 of rubber or other elastomeric material coupled thereon to protect the telephone lines disposed therethrough from being damaged or cut.

A rigid and essentially rectangular bottom plate 38 is coupled to the bottom edge 24 of the container. The plate has two spaced and aligned holes 40 disposed thereon. The holes are adapted to receive screws 42 in order to mount the container at a position to receive the internal and external telephone lines, such as on a wall or ceiling.

A rigid and essentially rectangular top plate 44 having rigid and essentially rectangular side plates 46, 48, 50, and 52 is coupled together end to end in a rectangular configuration around the periphery of the top plate to define a lid 54. The lid is adapted to fit over the top edge 22 of the container. The lid has a hole 56 disposed thereon adjacent to the periphery of the top plate 44. The hole 56 is adapted for receipt of a lock for securing the lid to the container.

A hinge 58 rotatably couples the lid 54 to the container 20. A lock 60 is disposed through the hole 56 of the lid for locking the lid to the container. The lock ensures that the container can only be accessed by authorized individuals, precluding possible unauthorized access of the space 26.

A trouble isolator circuit 70 is disposed within the space 26 of the container. The isolator circuit includes a plurality of telephone activation circuits 72 connected in parallel. The activation circuits are adapted to be connected in parallel with the external phone line 74. Each activation circuit has a switch 76 connected in series with an internal telephone line terminal 78, whereby an internal telephone line 80 and telephone 82 connected to the internal telephone line terminal may be activated or deactivated with the switch. A telephone test jack 84 is connected in parallel with the activation circuits 72 and adapted to be connected in parallel with an external phone line 74. The test jack is adapted to receive a test telephone 86 such that a user may monitor dial tones on the lines 30 and 34. The isolator circuit is adapted to be energized by an external power source 88.

A rigid and essentially rectangular front plate 90 is disposed over the trouble isolator circuit in the space. The plate has a plurality holes 92, 94, and 96 disposed thereon. The holes are adapted to provide a user access to the telephone test jack 84, internal telephone line terminals 78, or switches 76 of the isolator circuit 70 while shielding the rest of the isolator circuit from user interaction and environmental elements such as dust.

A second embodiment of the present invention includes a light source 100 connected in series with each telephone activation circuit 72. The light source provides a visual indication of the goodness of the telephone line when the switch 76 is turned to the on or off position.

A third embodiment of the present invention includes a speaker 110 connected to the telephone test jack 84 to test for dial tone on the selected telephone line. The speaker 110 is activated by an integral switch 112. The separate test telephone 86 is not required for this embodiment to be used.

In using the first embodiment 10 of present invention for testing individual phone lines to determine whether problems with telephones and telephone lines are internal to a home or business or external to a telephone branch exchange, the following steps are carried out:

Step 1: Plug a known operable test telephone 86 into the test jack 84.

Step 2: Turn off all of the internal telephone lines 80 using the switch 76 on each activation circuit 72.

Step 3: Listen for a dial tone. If a dial tone is heard, then a problem exists in an internal telephone line 80. If a dial tone is not heard, then the problem exists in the external telephone line 74.

Step 4: Turn on each internal telephone line 80 one at a time by using the switch 76 on each activation circuit 72 and listen for a dial tone. When an inoperable internal telephone line is turned on, the dial tone will not be heard.

Step 5: Turn off the inoperable internal telephone lines found as a result of Step 4 with the switch 76. Now, to determine whether the trouble is in the internal telephone line or the telephone, unplug the suspected inoperable telephone, and while listening with the test telephone 86, turn on the suspected bad telephone line. If a dial tone is heard, the telephone is inoperable, but if no dial tone is heard, the line is inoperable.

Step 6: turn on the remaining operable internal telephone lines in order to restore service.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A telephone trouble isolator comprising:

four rigid and essentially rectangular side plates coupled together end to end in a rectangular configuration to define a container having a top edge, a bottom edge, and a space therebetween, with two adjacent sides each having a hole disposed thereon, with one hole adapted for receipt of a plurality of internal telephone lines and the other hole adapted for receipt of an external telephone line and with each hole used for holding the lines received therethrough in a general fixed arrangement for ready access, each hole further having a rubber grommet coupled thereon to protect the telephone lines disposed therethrough from being damaged;

a rigid and essentially rectangular bottom plate coupled to the bottom edge of the container, the plate having two spaced and aligned holes disposed thereon, the holes adapted to receive screws in order to mount the container at a position to receive the internal and external telephone lines;

a rigid and essentially rectangular top plate having four rigid and essentially rectangular side plates coupled together end to end in a rectangular configuration around the periphery of the top plate to define a lid, the lid adapted to fit over the top edge of the container, the lid having a hole disposed thereon adjacent to the periphery of the front face, with the hole adapted for receipt of a lock for securing the lid to the container;

a hinge rotatably coupling the lid to the container with the lid positionable in proximity with the container for covering the space therein;

a lock disposed through the hole of the lid for locking the lid to the container, thereby preventing unauthorized access to the space;

a trouble isolator circuit disposed within the space of the container, the isolator circuit including a plurality of telephone activation circuits connected in parallel, the activation circuits adapted to be connected in parallel with the external phone line, each activation circuit having a switch connected in series with an internal telephone line terminal, whereby an internal telephone line connected to the internal telephone line terminal may be activated or deactivated with the switch, each activation circuit further having a light source connected in series with the switch with each light source providing a visual indication of the goodness of an internal telephone line, and a telephone test jack connected in parallel with the activation circuits and adapted to be connected in parallel with an external phone line, the test jack further adapted to be connected with a known operable test telephone such that a user may monitor dial tone on the lines, with the isolator circuit adapted to be energized by an external power source; and a rigid and essentially rectangular front plate disposed over the trouble isolator circuit in the space, the plate having a plurality holes disposed thereon, the holes adapted to provide a user access to the telephone test jack, internal telephone line terminals, or switches of the isolator circuit while shielding the rest of the isolator circuit from user interaction and environmental elements such as dust.

2. A process for testing individual phone lines to determine whether problems with telephones and telephone lines are internal to a home or business or external to a telephone branch exchange, the process comprising the steps of:

providing four rigid and essentially rectangular side plates coupled together end to end in a rectangular configuration to define a container having a top edge, a bottom edge, and a space therebetween, with two adjacent sides each having a hole disposed thereon, with one hole adapted for receipt of a plurality of internal telephone lines and the other hole adapted for receipt of an external telephone line and with each hole used for holding the lines received therethrough in a general fixed arrangement for ready access, each hole further having a rubber grommet coupled thereon to protect the telephone lines disposed therethrough from being damaged;.

providing a rigid and essentially rectangular bottom plate coupled to the bottom edge of the container, the plate having two spaced and aligned holes disposed thereon, the holes adapted to receive screws in order to mount the container at a position to receive the internal and external telephone lines;

providing a rigid and essentially rectangular top plate having four rigid and essentially rectangular side plates coupled together end to end in a rectangular configuration around the periphery of the top plate to define a lid, the lid adapted to fit over the top edge of the container, the lid having a hole disposed thereon adjacent to the periphery of the front face, with the hole adapted for receipt of a lock for securing the lid to the container;

providing a hinge rotatably coupling the lid to the container with the lid positionable in proximity with the container for covering the space therein;

providing a lock disposed through the hole of the lid for locking the lid to the container, thereby preventing unauthorized access to the space;

providing a trouble isolator circuit disposed within the hollow container, the isolator circuit including a plurality of telephone activation circuits connected in parallel, the activation circuits adapted to be connected in parallel with the external phone lines, each activation circuit having a switch connected in series with an internal telephone line terminal, whereby an internal telephone line connected to the internal telephone line terminal may be activated or deactivated with the switch, each activation circuit further having a light source connected in series with the switch with each light source providing a visual indication of the goodness of an internal telephone line, and a telephone test jack connected in parallel with the activation circuits and adapted to be connected in parallel with external phone lines, the test jack adapted to be connected with a known operable test telephone such that a user may monitor dial tone on the lines, with the isolator circuit adapted to be energized by an external power source;

plugging a known operable test telephone into the test jack;

turning off all of the internal telephone lines using the switch on each activation circuit;

listening for a dial tone such that if a dial tone is heard, then a problem exists in an internal telephone line, and if a dial tone is not heard, then the problem exists in an external telephone line;

turning on each internal telephone line one at a time by using the switch on each activation circuit and listening for a dial tone such that when an inoperable internal telephone line is turned on, the dial tone will not be heard;

turning off the inoperable internal telephone lines; and turning on the remaining operable internal telephone lines to restore service.

* * * * *